United States Patent [19]

Young

[11] Patent Number: 4,645,137
[45] Date of Patent: Feb. 24, 1987

[54] SPINNING REEL WITH QUICKLY ADJUSTABLE DISC DRAG

[75] Inventor: John N. Young, Fairfax, Calif.

[73] Assignee: Charles C. Worth Corporation, et al, Kentfield, Calif.

[21] Appl. No.: 850,613

[22] Filed: Apr. 11, 1986

[51] Int. Cl.[4] ............ A01K 89/01; A01K 89/02
[52] U.S. Cl. ............ 242/84.5 A; 188/71.7; 188/72.7; 188/83; 74/568 R
[58] Field of Search ............ 242/84.21 R, 84.2 R, 242/84.2 G, 84.5 A, 84.51 A, 84.5 P; 188/71.5, 71.7, 72.7, 72.9, 79.5 GT, 83, 381; 74/568 R

[56] References Cited

U.S. PATENT DOCUMENTS

| | | | |
|---|---|---|---|
| 2,598,879 | 7/1986 | Fujigiwa et al. | 242/84.51 R |
| 2,656,993 | 10/1953 | Dukes | 242/84.53 |
| 2,988,298 | 6/1961 | Purnell | 242/84.53 |
| 3,574,339 | 4/1971 | Sarah | 242/84.5 A |
| 4,555,072 | 11/1985 | Hitomi | 242/84.5 R |
| 4,572,448 | 2/1986 | Ban | 242/84.5 A |
| 4,591,108 | 5/1986 | Ban | 242/84.5 R |

Primary Examiner—Billy S. Taylor
Attorney, Agent, or Firm—Melvin R. Stidham

[57] ABSTRACT

A drag control for a spinning reel includes a disc that rotates with the main shaft. A primary drag plunger is moved against one side of the disc to establish the preset drag. The secondary drag plunger directly opposing the primary plunger is mounted on a cam follower, and a hand-operated cam moves the follower selectively toward or away from the disc. The cam is tapered from side to side so that a different range of movement will be imparted to the cam follower, depending upon the circumference of that portion of the cam engaged by the cam follower.

2 Claims, 4 Drawing Figures

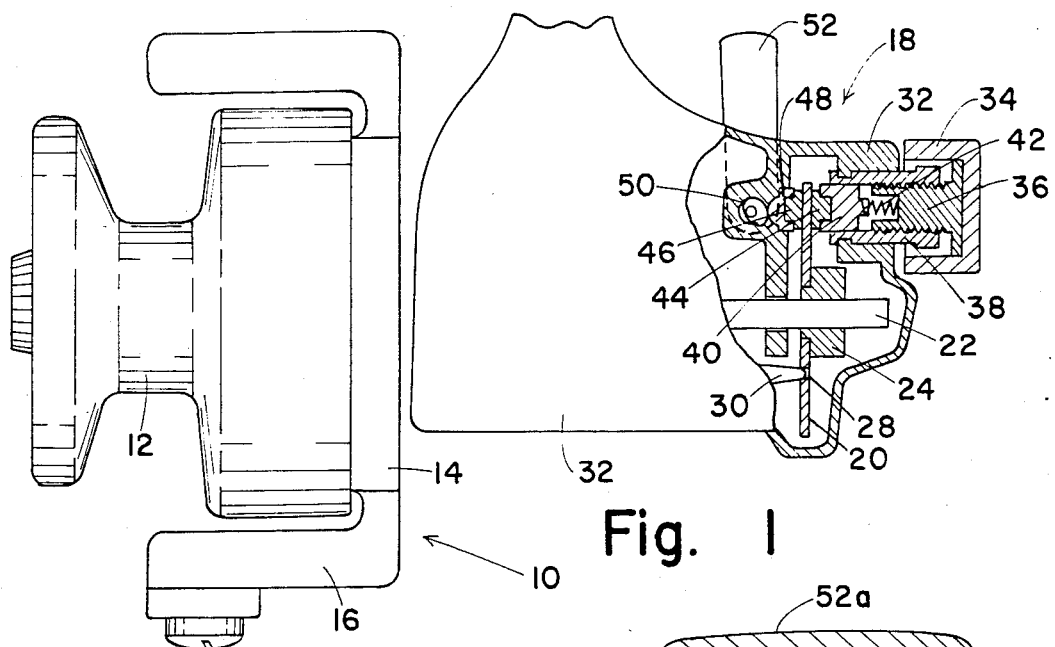
Fig. 1
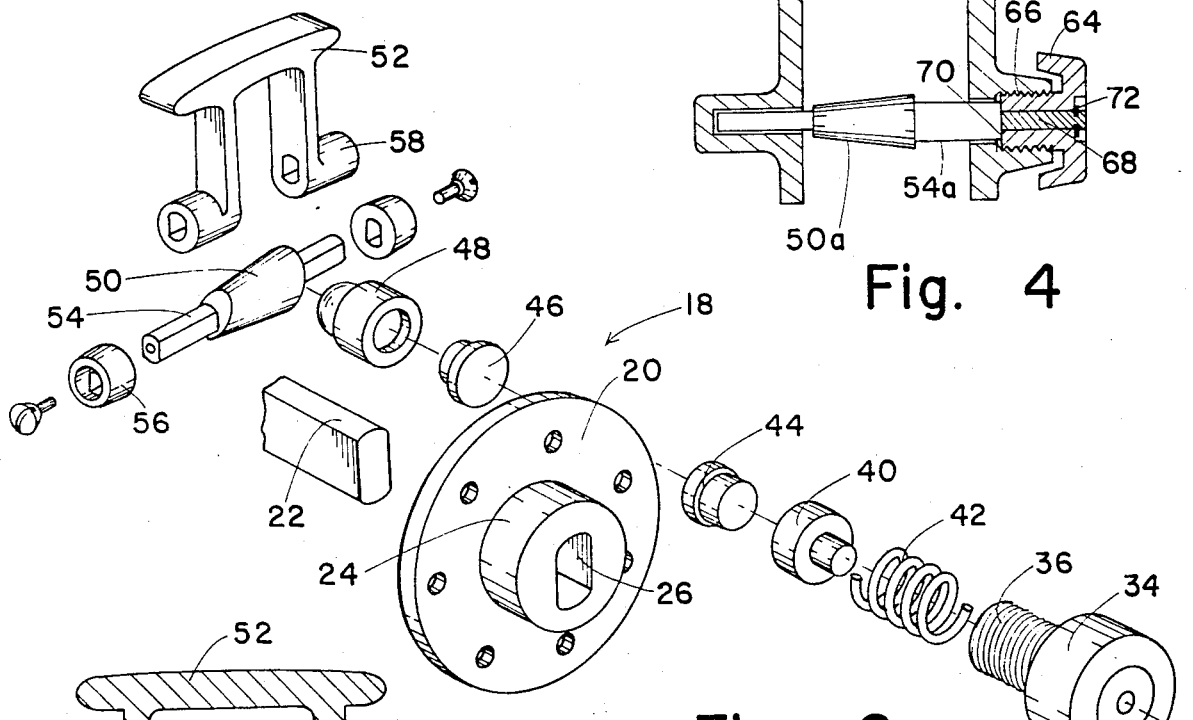
Fig. 4
Fig. 2
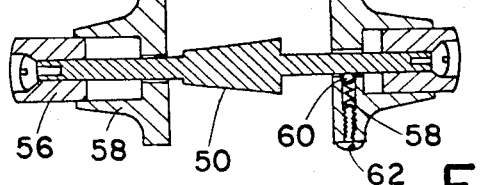
Fig. 3

SPINNING REEL WITH QUICKLY ADJUSTABLE DISC DRAG

BACKGROUND OF THE INVENTION

In a spinning reel, the spool does not rotate when the fisherman is casting and retrieving. The momentum of the lure being cast simply pulls the line and uncoils it from the reel spool. Even when retrieving the line, the spool itself normally does not rotate because a drag mechanism is set to hold the spool against rotation. However, the drag mechanism can be overcome to allow the spool to rotate when a predetermined tension on the line is exceeded, thus enabling a hooked fish to take out line without breaking it off.

In a spinning reel, it is desirable to be able to preset the drag to accommodate a given tension in the line, but to have available secondary means for quickly adjusting the drag either up or down from the preset level, without changing the given setting. It is further desirable that such secondary means for adjusting drag be itself variable so that its range of adjustment can be varied to accommodate different fishing conditions.

OBJECTS OF THE INVENTION

It is an object of this invention to provide a spinning reel with a drag mechanism that provides greater range of drag control, as well as a smoother operation.

It is a further object of this invention to provide a spinning reel with a drag mechanism that provides a preset drag and, in addition, enables the fisherman quickly and temporarily to increase or decrease the drag strength.

It is a further object of this invention to make the secondary drag adjustment means itself adjustable to provide selective ranges of drag variation.

Other objects and advantages of this invention will become apparent from the description to follow, particularly when read in conjunction with the accompanying drawings.

SUMMARY OF THE INVENTION

In carrying out this invention, a drag disc is slidably keyed or splined to the main shaft of a spinning reel and a dial-controlled friction brake is biased against one side of the disc to provide the preset drag, to hold the main shaft against rotation until a predetermined line tension is exceeded. A second friction braking means is biased against the other side of the disc under instantaneous control of a lever-operated cam, by means of which the fisherman can effect a simple and quick upward or downward adjustment to the drag strength without altering the position of the dial. The cam is tapered from one side to the other, and it is movable axially, so that different ranges of movement are imparted to the cam follower, depending on where it engages the cam. This provides means for selecting the available range of instantaneous drag adjustment.

BRIEF DESCRIPTION OF THE DRAWING

In the drawing:

FIG. 1 is a side elevation of a spinning reel, partially broken away to show one embodiment of this invention;

FIG. 2 is an exploded view of the drag mechanism of FIG. 1;

FIG. 3 is a section view of the instantaneous drag control; and

FIG. 4 is a section view of another embodiment of this invention;

DESCRIPTION OF PREFERRED EMBODIMENTS

The Embodiment of FIGS. 1 to 3

A typical spinning reel 10 includes a spool 12, which normally does not turn, and a rotating drum 14, which carries bail arms 16 to wind a line being retrieved onto the spool 12.

The drag adjustment means 18 of this invention includes a disc 20, which is slidably, but not rotatably carried on the main shaft 22 of the spinning reel 10, the disc being carried on a hub 24 with complementary flats 26 on the shaft 22 and in the hub 24. A series of holes 28 in and around the disc 20 are engaged by a click spring 30 that is fixed to the reel body 32 so that its tip may protrude into a hole 28 in alignment therewith. Hence, if the drag mechanism to be described, is overcome and the shaft 22 turns, the clock spring 30 will jump from one hole 28 to the next, giving off an audible clicking sound to alert the fisherman that the main shaft 22 is rotating and that the preset drag tension has been overcome.

The basic drag setting is achieved by turning a knob or dial 34 to thread a screw 36 into an internally threaded drag tube 38, which is fixed to the reel body 32. The adjustment screw 36 biases a drag plunger 40 through a spring 42, and the drag plunger carries a primary friction pad 44 that engages a spot aligned therewith on the rear face of the drag disc 20. Hence, as the dial 34 is turned further to thread the screw into the drag tube 38 the spring 42 is compressed further to apply increased local pressure against the rear face of the disc 20 and thereby increase the preset drag tension.

When the angler is alerted, by the clicking of the spring 30, that the preset drag has been exceeded, he can operate the secondary drag as needed in accordance with the circumstances.

In the embodiment of FIGS. 1 to 3, a second friction drag pad 46 is carried on a cam follower 48 that engages the surface of a partially rotatable cam 50. The cam 50, in turn, is partially rotated by a pair of drag lever arms 52, which are secured to the cam shaft 54. The cam surface 50 is designed so that a relatively small fore or aft arcuate movement of the lever arms 52 by movement of the angler's fingers causes a relatively large movement of the cam follower 48 toward and away from the drag disc 20.

In addition, as shown in FIGS. 2 and 3 the cam 50 is tapered from one side to the other so that there is a difference in cam diameters across the width of the cam 50. For a given arcuate movement of the drag lever 52 the different cam diameters will produce different strokes of the cam follower 48. Hence, the range of drag adjustment produced by the drag lever 52 can be varied, depending on the portion of the cam 50 engaged by the cam follower. This can be accomplished by securing push buttons 56 (FIG. 3) onto the ends of the cam shafts 54 so that finger pressure on the push buttons 56 will move them through complementary slideways 58 on the sides of the drag lever 52, moving the cam 50 laterally to an adjusted position. Suitable means, such as a spring detent 60 adjusted by screw 62 will fix the position of the cam 50 and, accordingly, the portion thereof to be engaged by the cam follower 48.

Because of the tapered cam, the same arcuate movements of the drag lever will produce different movements of the cam follower 48 and provide a different range of drag adjustment to meet different fishing conditions. Since the range adjustment on the drag lever is at the back of the reel 10, it will not interfere with the fishing line or the rotating head 14 at the front of the reel, and it will enable range adjustment to be made while playing a fish.

The Embodiment of FIG. 4

In this embodiment, a tapered cam 50a is moved axially to an adjusted position in opposition to the cam follower 48 by means of an adjustment screw 64, which is threaded into a sleeve 66 fixed on the drag lever 52a. The screw 64 is rotatable on an extension 68 of the cam shaft 54a, but it is fixed axially thereon, between a shoulder 70 and a clip 72. As is apparent, threading the screw 64 into or out of the sleeve 66 will adjust the axial position of the cam 50a.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. In a spinning reel including a reel body, a main shaft rotatable on said body and a spool carried on said main shaft to rotate therewith, a drag control comprising:

a drag disc slidably carried on said main shaft to rotate therewith;

a primary drag plunger movable on said body parallel to said main shaft to engage an aligned spot on a face of said disc;

yieldable means biasing said primary plunger against one side of said disc to impose a preset drag on said main shaft;

a secondary drag plunger movable on said body in alignment with said primary drag plunger to engage the opposite side of said disc;

a cam member rotatable about an axis on said body and engaging said secondary drag plunger to increase pressure against said disc when rotated in one direction and to decrease pressure against said disc when rotated in the other direction;

a finger-operated drag lever for rotating said cam partially in either of said directions;

said cam member being tapered along the axis thereof to impart different ranges of movement to said secondary drag plunger at different locations along the axis thereof; and means for moving said cam member axially on said body to different selected positions.

2. The drag control defined by claim 1 wherein said means for moving the cam member includes:

an axial extension on said cam member;

a threaded member rotatable but not axially slidable on said extension;

a complementary threaded sleeve on said body receiving said threaded member so that rotation of said threaded member produces axial movement of said cam member.

* * * * *